United States Patent [19]

Siol et al.

[11] Patent Number: 4,647,489

[45] Date of Patent: Mar. 3, 1987

[54] MULTILAYER WEB PLATE WITH IMPROVED LIGHT-PERMEABILITY

[75] Inventors: Werner Siol, Darmstadt-Eberstadt; Wolfgang Arnold, Bensheim; Heinz Vetter, Rossdorf, all of Fed. Rep. of Germany

[73] Assignee: Rohm GmbH Chemische Fabrik, Darmstadt, Fed. Rep. of Germany

[21] Appl. No.: 860,982

[22] Filed: May 8, 1986

[30] Foreign Application Priority Data

May 15, 1985 [DE] Fed. Rep. of Germany ... 8514365[U]

[51] Int. Cl.$^4$ .......................... B32B 3/12; B32B 7/02
[52] U.S. Cl. .................................. 428/119; 428/188; 428/212; 428/213
[58] Field of Search ............... 428/119, 212, 213, 166, 428/178, 188

[56] References Cited

U.S. PATENT DOCUMENTS 4,565,723  1/1986  Hirsch ............................... 428/119
4,569,875  2/1986  Pöhlmann et al. .................. 428/119

FOREIGN PATENT DOCUMENTS 2230901  6/1972  Fed. Rep. of Germany ...... 428/188

Primary Examiner—William J. Van Balen
Attorney, Agent, or Firm—Oblon, Fisher, Spivak, McClelland & Maier

[57] ABSTRACT

The novel multilayer web plate comprises two generally planar outer walls and webs joining said walls to form a unit construction. According to the invention, the outer walls each comprise a combination of a core layer representing more than half the thickness of the outer wall and comprised of an extrudable, stiff plastic material with optical index of refraction $n \geq 1.48$, and inner and outer surface layers adhesively bonded to both faces of the core layer and comprised of a hard plastic material with an optical index of refraction $n \leq 1.46$. With this configuration, reflection losses of the transmitted light are avoided, and the light-permeability is substantially improved.

13 Claims, 4 Drawing Figures

MULTILAYER WEB PLATE WITH IMPROVED LIGHT-PERMEABILITY

BACKGROUND OF THE INVENTION

1. Field of the Invention

The invention relates to a multilayer web plate comprised of plastic material. The web plate comprises two generally planar outer walls, and further comprises structural webs joining the walls to form a unit construction. The outer walls are each comprised of a plurality of adhesively joined layers comprised of different plastic materials. Web plates of this type can be fabricated by extrusion, and as a rule have the same profile over their entire length in the extrusion direction.

2. Discussion of the Background

A multilayer web plate is known from Eur. OS A No. 110,221. The outer walls of the web plate are comprised of a supporting layer of polycarbonate plastic, an intermediate layer of modified polycarbonate plastic, and a surface layer of polymethyl methacrylate. The layered structure serves to improve resistance to ultraviolet light and to improve manufacturing qualities.

Another multilayer web plate is disclosed in Eur. OS A No. 118,683. The outer walls are comprised of a supporting outer layer of an acrylic glass substitute and a thinner inner layer of a high impact plastic, e.g., polycarbonate, whereby overall high impact resistance is attained.

According to Ger. AS No. 16 94 273, a pane comprised of polycarbonate plastic is coated with a polymethyl methacrylate varnish, whereby the light-permeability of the pane is slightly improved.

A disadvantage of known two-wall web plates having outer walls with a single-layer or multilayer structure is that they have low light-permeability. Even if they are manufactured from maximally clear polycarbonate plastic, with the webs disposed perpendicularly to the outer walls, the light-permeability is only about 78%. If the outer walls are coated with a polymethyl methacrylate varnish according to the teaching of Ger. AS No. 16 94 273, the light-permeability is increased only slightly, to 80%.

Accordingly, the underlying problem to be solved by the invention is to substantially increase the light-permeability of plastic web plates without altering their spatial dimensions (e.g., the disposition and number of webs).

SUMMARY OF THE INVENTION

An object of the invention is produce multilayer plastic web plates with substantially increased light-permeability without altering their spacial dimensions.

Another object of the invention is to produce multilayer plastic web plates containing intermediate layers and still having substantially increased light-permeability.

A further object of the invention is to produce multilayer plastic web plates with a scratch-resistant layer which have substantially increased light-permeability.

These objects and other objects which will become apparent from the specification have been achieved by the multilayer plastic web plates of the present invention. These multilayer web plates are comprised of plastic material, wherein the web plate is comprised of two generally planar outer walls and webs joining the walls to form a unit construction. The outer walls are each comprised of a plurality of adhesively joined layers comprised of different plastic materials and characterized by having a combination of a core layer, representing more than half the thickness of the outer wall and being comprised of an extrudable, stiff plastic material with an optical index of refraction greater than or equal to 1.48, and inner and outer surface layers disposed on both faces of the core layer. The inner and outer surface layers are comprised of a hard plastic material with an optical index of refraction less than or equal to 1.46. The multilayer web plates of the present invention show a substantive increase in light-permeability.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF THE PREFERRED EMBODIMENTS

The increased light-permeability of the plates of the present invention is attributable to reduced reflection losses at the plastic-air interfaces. The two outer walls taken together have four such interfaces, so that reflection losses are multiplied by 4. The amount of reflection loss R at an interface depends on the index of refraction n of the plastic, according to the following formula:

$$R = \left(\frac{n-1}{n+1}\right)^2$$

Since many plastics employed for manufacturing web plates have high indices of refraction, the reflection losses are correspondingly large. If a surface layer of reduced index of refraction is employed, the reflection loss can be substantially reduced. At the same time, experience has shown that reflection losses at the other interfaces (between the different plastic materials) are negligibly small. Because of the multiplying effect of reflection losses at a plurality of interfaces, it is crucial for all interfaces, including those on the interior faces of the outer walls, to be coated with a plastic with a reduced index of refraction.

If the web plate has one or more intermediate planar layers between the two outer walls (with the intermediate layers being preferably parallel to the outer walls), these layers should be comprised entirely of a plastic with a reduced index of refraction or should at least be coated on their surfaces with such a plastic. The reason for this is as stated above. The presence of such intermediate layers will of course reduce the light-permeability compared to that of a web plate without intermediate layers; however, it will do so to a lesser extent than if the planar intermediate layers were comprised of plastic material with a higher index of refraction.

Figure 1:
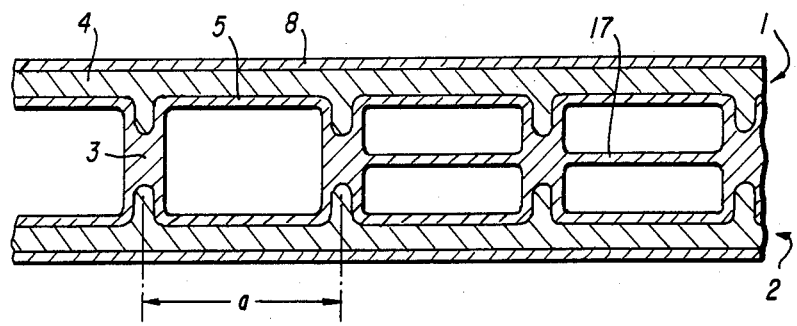
FIGS. 1 to 3 show segments of two inventive web plates in cross section.
Figure 2:
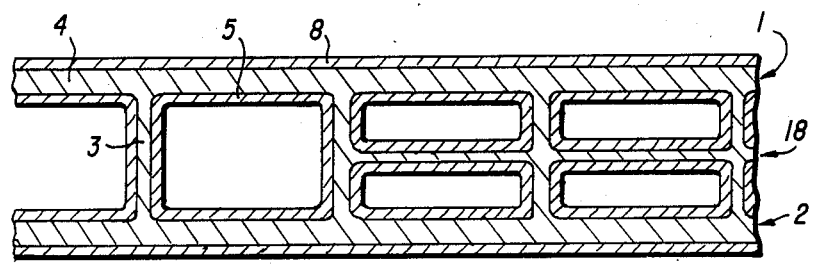
Figure 3:
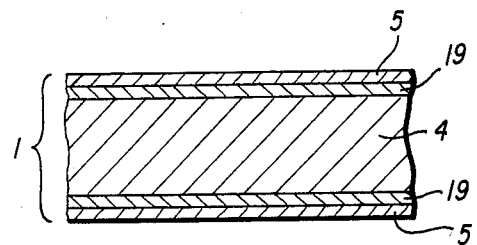
Figure 4:
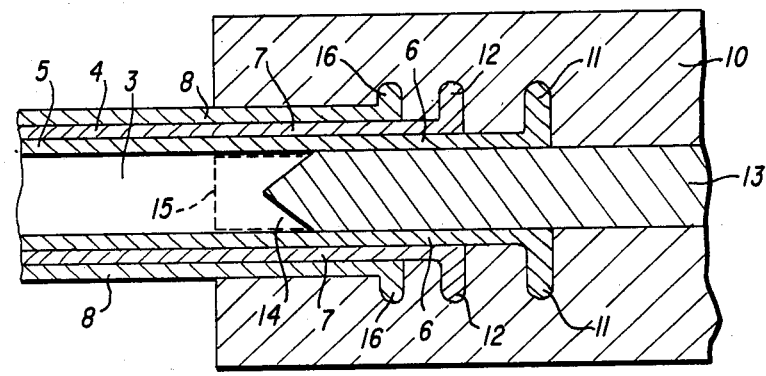
FIG. 4 refers to the fabrication of the novel web plate by co-extrusion and shows an extrusion nozzle in cross section.

The structure of the novel web plate will now be described in more detail, with reference to FIGS. 1 to 3, which show segments of cross sections of two inventive web plates. The fabrication of the novel web plate by co-extrusion will be described with reference to FIG. 4, which shows a cross section through an extrusion nozzle.

The outer walls (1, 2) are generally parallel, and are a smooth as possible on both faces. They are unitarily joined by webs 3. The unitary construction comes about by common extrusion of the webs and the outer walls, or by welding of separately extruded webs and outer walls.

Because of the supporting function of the core layer 4, its thickness is greater than half that of the outer wall (1, 2), and preferably 70–99%. Both surface layers (5, 8) preferably have approximately the same thickness, and taken together comprise about 30% to 1% of the thickness of each outer wall.

The thickness of the outer walls and webs is not of major importance in determining the light-permeability of the web plate. As a rule, the webs are about the same thickness as the outer walls, namely about 1/20 to 1/5 the overall thickness of the web plate. The distance a between webs is preferably about 1–2 times the overall thickness d of the web plate. If one or more planar intermediate layers are present, these may be much thinner than the outer walls, e.g., an intermediate layer may have a thickness of 0.1–1 mm. As a rule the overall thickness d is 5–50 mm, and the overall width is 0.5–3 m.

The plastic of the core layer 4 provides the mechanical strength of the web plate. Therefore at room temperature it must be hard and stiff, and preferably it should have high impact strength. Many plastics with these properties have high indices of refraction, with $n_D^{20} > 1.48$. For example:

| | |
|---|---|
| Polymethyl methacrylate | n = 1.49; |
| Polystyrene | n = 1.6; |
| Bisphenol A polycarbonate | n = 1.6; |
| Polyvinyl chloride | n = 1.55. |

Commercially available extrudable plastics of these types often contain modifying additives or comonomers. These additives or comonomers have an effect on the structure of the polymer. However, since such modifying agents generally have minimal effect on the index of refraction, they may be disregarded in the present discussion.

If the web plate is fabricated by co-extrusion of all layers, the plastics used must be capable of being satisfactorily co-extruded, and must have good mutual adhesion. Preferably all plastics employed should be clear and colorless, and may contain the usual UV-absorbers.

The plastic of surface layers 5 and 8 must be hard at room temperature in order for the useful properties of the web plate to be preserved. Plastics with a fluorine content of at least 10 wt. % have been generally found to have unusually low indices of refraction, and are preferred for the surface layers in the case of co-extrusion. Suitable plastics are polymeric fluoroalkyl esters of acrylic or methacrylic acid, such as polypentadecafluorooctyl acrylate ($n_D^{20} = 1.339$) and trifluorovinyl acetate ($n_D^{20} = 1.375$); and also mixed polymers comprised of such monomers in the amount of at least 30 wt. %.

Particularly suitable plastics are transparent mixtures of polyvinylidene fluoride and polyalkyl (meth)acrylates, in particular polymethyl methacrylate. Mixtures in a ratio of 20–90 parts by weight of the fluorinated plastic to 80–10 parts by weight of the acrylic plastic, particularly 40–90:60–10, are homogeneous, while a higher proportion of polyvinylidene fluoride results in an undesirable tendency of the mixture to crystallize, particularly when cooled slowly.

To fabricate the web plate by co-extrusion, a multi-component slot nozzle 10 is employed, having core pieces 15 for forming the webs 3. The plastic of the core layer, in the thermoplastic state, is forced out from the molding channels 12 into respective layers 7 on both sides of the core pieces 15. The thermoplastic molding compounds for forming the inner and outer surface layers are pressed out of the molding channels 11 and 16 in such a way that the core layers are coated on both faces with layers 6 and 8 of the surface-layer material. Part of the molding composition carried along in the innermost layer 6 is pressed into the gaps 14 between the core pieces 15, for forming the webs 3. In the process, generally a part of the material of the core layer is pulled along, as shown in the cross sectional view of FIG. 1. If desired, the same stream of material (11 and 6) may be employed to produce one or more planar intermediate layers 17 also.

If the web plate is to be subjected to frequent mechanical stressing when in use, it is recommended that a hard surface coating with scratch resistance be employed, so as to substantially reduce light transmission losses through dispersion from scratches. Because the scratch-resistant layer will only fulfill its purpose if it comprises the outer surface layer 8, it must be comprised of a plastic having an index of refraction of <1.48. Suitable such plastics are, in particular, polysiloxane coatings, which are known from, e.g., Eur. OS A No. 73 911. Advantageously, they are produced from a liquid coating mixture by application, drying, and possibly curing.

In a particularly advantageous coating process, the inner and outer surface layers are produced simultaneously. As a rule, the web plate is extruded as a single unit, comprised of plastic with n>1.48. For the coating process, the web plate, having its end faces still uncoated and uncovered, and preferably having vertical webs, is lowered into the liquid coating mixture so that the inner and outer surfaces are wetted. It is then withdrawn, and after the excess is allowed to drain off the web plate, the coating can be dried and cured. Any intermediate layers 18 which are present are coated at the same time.

Although scratch-resistance of the coating on the inner surfaces of the web plate is unimportant, the described dipping process has proven more economical than production of the surface layers (5, 8) by co-extrusion extrusion and subsequent application of a scratch-resistant coating to the outer surfaces.

If when a dip-coating process is employed, there is poor adhesion of the surface layer to the surface of the core layer, this may be remedied by applying an intermediate layer 19 before applying the surface layer 5. Layer 19 may also be applied by dip coating. It is selected to adhere well to both the core layer 4 and the surface layer 5. Its thickness is advantageously less than 100 microns, preferably less than 20 microns, and it is preferably comprised of a material with an index of refraction between that of the core layer material and the surface layer material. For example, for a basic hollow-chamber shape comprised of polystyrene, polycarbonate, or polyvinyl chloride, it has proven advantageous to coat first with an intermediate layer 19 of polymethyl methacrylate and then with the surface layer 5.

Other features of the invention will become apparent in the course of the following descriptions of exemplary embodiments which are given for illustration of the invention and are not intended to be limiting thereof.

EXAMPLE 1

The core shape was a three-layer web plate having the following parameters:
Material: Polymethyl methacrylate ($n_D^{20}=1.49$).
Plate thickness: 16 mm.
Web separation (a): 16 mm.
Thickness of outer walls (1, 2): 1.2 mm.
Thickness of each web (3): 1.2 mm
Thickness of the middle member (18): 0.5 mm.

This core shape was dip-coated on all sides with a scratch-resistant varnish based on a siloxane ("Acriplex 100 sr" of the firm Roehm GmbH, with $n_D^{20}=1.43$ of the cured varnish), and was then cured.
Results:
Thickness of the polysiloxane layer: 4 microns.
Plate characteristics: Highly glossy, scratch resistant, with improved light-permeability.
Light-permeability of the untreated plate: 77%.
Light-permeability of the treated plate: 81%.

EXAMPLE 2

A three-layer web plate with the same dimensions and structure as the web plate of Example 1, but comprised of polycarbonate ($n_D^{20}=1.6$), was dip-coated on all sides with a primer (PMMA, i.e., polymethyl methacrylate). Then, the web plate was coated as in Example 1, with a scratch-resistant varnish based on a siloxane ("Acriplex 100 sr" of the firm Roehm GmbH).
Thickness of the primer layer (19): 10 microns.
Thickness of the polysiloxane layer: 5 microns.
Light-permeability of the untreated plate: 68%.
Light-permeability of the treated plate: 78%.

EXAMPLE 3

The core shape was a two-layer web plate having the following parameters:
Material: Polycarbonate ($n_D^{20}=1.6$).
Plate thickness: 10 mm.
Web separation (a): 10 mm.
Thickness of outer walls (1, 2): 1 mm.

This core shape was first coated with a PMMA primer analogously to Example 2, and then with a scratch-resistant varnish based on a polysiloxane.
Thickness of the primer layer (19): 2 microns.
Thickness of the polysiloxane layer: 4 microns.
Light-permeability of the untreated plate: 76%.
Light-permeability of the coated plate: 82%.

EXAMPLE 4

A web plate 16 mm thick having webs 1 mm thick and having its polymethyl methacrylate outer walls coated on their outer and inner faces with co-extruded layers 30 microns thick comprised of a transparent mixture of 80 wt. % polyvinylidene fluoride and 20 wt. % polymethyl methacrylate ($n_D^{20}=1.44$ of the coating), had a light-permeability of 87%. By comparison, the light-permeability of a web plate having the same shape and dimensions but comprised of pure polymethyl methacrylate was only 84%.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multilayer plastic web plate comprising:
   (i) two generally planar outer walls and
   (ii) webs joining said walls to form a unit construction, wherein said outer walls are each comprised of a plurality of adhesively joined layers comprised of different plastic materials; wherein said outer walls each comprise a combination of a core layer representing more than half the thickness of the said outer wall and are comprised of an extrudable, stiff plastic material with an optical index of refraction $n \geq 1.48$, and
   (iii) inner and outer surface layers disposed on both faces of the said core layer and comprised of a hard plastic material with an optical index of refraction $n \leq 1.46$.

2. The multilayer web plate of claim 1, wherein the said plastic of the said core layer is a polymethyl methacrylate, polycarbonate, polystyrene, or polyvinyl chloride plastic.

3. The multilayer web plate of claim 2, wherein the said plastic of said core layer is comprised of a polycarbonate plastic based on bisphenol A.

4. The multilayer web plate of claim 2, wherein the said plastic of the said core layer is comprised of polymethyl methacrylate.

5. The multilayer web plate of claim 1, wherein the said surface layers are joined to the said core layer by co-extrusion.

6. The multilayer web plate of claim 1, wherein the said plastic of the said surface layers contains fluorine in the amount of at least 10 wt. %.

7. The multilayer web plate of claim 6, wherein the said plastic of the said surface layers is comprised of a transparent mixture comprised of polyvinylidene fluoride and a polyalkyl (meth)acrylate.

8. The multilayer web plate of claim 7, wherein the said transparent mixture is comprised of 20–90 wt. % polyvinylidene fluoride and 80–10 wt. % of polymethyl methacrylate.

9. The multilayer web plate of claim 1, further comprising at least one planar intermediate layer present in the said web plate, between the said outer walls thereof, and wherein at least the surfaces of said intermediate layer are comprised of a plastic material with an index of refraction $n \leq 1.46$.

10. The multilayer web plate of claim 1, wherein the said surface layers are comprised of a polysiloxane material.

11. The multilayer web plate of claim 10, wherein the said surface layers are comprised of a polysiloxane material which is not thermoplastic.

12. The multilayer web plate of claim 1, wherein an intermediate layer is disposed between the said surface layers and the said core layer, and wherein said intermediate layer adheres well to said surface and core layers.

13. The multilayer web plate of claim 12, wherein the said intermediate layer has an optical index of refraction which is between that of the said core layer and that of the said surface layer.

* * * * *